US010704535B2

(12) United States Patent
Christensen

(10) Patent No.: US 10,704,535 B2
(45) Date of Patent: Jul. 7, 2020

(54) METHOD AND ASSEMBLY FOR ALIGNING WIND TURBINE STRUCTURAL PARTS

(71) Applicant: MHI Vestas Offshore Wind A/S, Aarhus N (DK)

(72) Inventor: Kim Christensen, Randers (DK)

(73) Assignee: MHI Vestas Offshore Wind A/S, Aarhus N (DK)

( * ) Notice: Subject to any disclaimer, the term of this patent is extended or adjusted under 35 U.S.C. 154(b) by 0 days.

(21) Appl. No.: 16/347,215

(22) PCT Filed: Nov. 23, 2017

(86) PCT No.: PCT/DK2017/050388
§ 371 (c)(1),
(2) Date: May 3, 2019

(87) PCT Pub. No.: WO2018/095497
PCT Pub. Date: May 31, 2018

(65) Prior Publication Data
US 2019/0277259 A1 Sep. 12, 2019

(30) Foreign Application Priority Data
Nov. 23, 2016 (DK) .................................. 2016 70930

(51) Int. Cl.
F03D 13/10 (2016.01)
E04H 12/08 (2006.01)
E04H 12/34 (2006.01)

(52) U.S. Cl.
CPC ........... F03D 13/10 (2016.05); E04H 12/085 (2013.01); E04H 12/342 (2013.01); F05B 2230/604 (2013.01)

(58) Field of Classification Search
CPC ..... E04H 12/342; E04H 12/085; F03D 13/10; F05B 2230/604
See application file for complete search history.

(56) References Cited

U.S. PATENT DOCUMENTS 6,568,712 B1 * 5/2003 Aaron, III .......... B23K 37/0533
285/24
9,127,650 B2 * 9/2015 Moestrup .............. E04H 12/342
(Continued)

FOREIGN PATENT DOCUMENTS

CN       1561569 A    1/2005
CN     101160439 A    4/2008
(Continued)

OTHER PUBLICATIONS

European Patent Office, International Search Report and Written Opinion in PCT Application No. PCT/DK2017/050388, dated Feb. 15, 2018.
(Continued)

Primary Examiner — Andrew J Triggs
(74) Attorney, Agent, or Firm — Wood Herron & Evans LLP

(57) ABSTRACT

The present invention relates to an assembly of two structural parts of a wind turbine wherein the structural parts are to be connected in a flange-to-flange connection by a number of bolts and such that a flange of the first structural part and a flange of the second are centrally and rotationally aligned whereby a first borehole in the flange of the first structural part is matched and aligned with a corresponding first borehole in the flange of the second structural part. The structural parts may for example be a tower section or a foundation section. The assembly further comprises a first and a second rotational guide member releasably attached to each of the flanges of the structural parts. Each of the rotational guide members comprises a U-shaped or L-shaped structure of a first leg portion and a second leg portion connected by a central portion, the first leg portion ending in a positioning portion shaped to be inserted into a borehole of the flange, and the second leg portion comprising a stop member, and for at least one of the rotational guide members
(Continued)

the structure comprised in the rotational guide member is U-shaped. The stop member of the first rotational guide member is configured for abutment to the second leg portion of the second rotational guide member when the flanges of the first and second structural parts are centrally and rotationally aligned. The invention further relates to a method of positioning and connecting two structural parts of a wind turbine as described above. The method includes first centrally aligning the structural parts with the flanges face-to-face and then rotating the structural part relative to each other until the rotational guide members come into contact with each other.

21 Claims, 9 Drawing Sheets

(56) References Cited

U.S. PATENT DOCUMENTS

| | | | | |
|---|---|---|---|---|
| 9,518,563 | B2* | 12/2016 | Ollgaard | E04H 12/085 |
| 10,125,822 | B2* | 11/2018 | Ollgaard | E04H 12/085 |
| 2010/0307097 | A1* | 12/2010 | Word, III | E04H 12/085 52/651.07 |
| 2014/0237932 | A1* | 8/2014 | Moestrup | E04H 12/342 52/651.01 |
| 2015/0285225 | A1* | 10/2015 | Ollgaard | E04H 12/085 52/105 |
| 2019/0277259 | A1* | 9/2019 | Christensen | F03D 13/20 |

FOREIGN PATENT DOCUMENTS

| | | |
|---|---|---|
| CN | 102537518 A | 7/2012 |
| CN | 103403345 A | 11/2013 |
| CN | 103476696 A | 12/2013 |
| CN | 104919177 A | 9/2015 |
| EP | 2770199 A2 | 8/2014 |
| EP | 2998570 A1 | 3/2016 |
| GB | 2483677 A | 3/2012 |
| GB | 2493948 A | 2/2013 |
| WO | 2010029210 A1 | 3/2010 |
| WO | 2014075686 A1 | 5/2014 |

OTHER PUBLICATIONS

Danish Patent and Trademark Office, Search and Examination Report in PA 2016 70930, dated Mar. 21, 2017.
China National Intellectual Property Administration, First Notification of Office Action in CN Application No. 201780069258.9, dated Feb. 3, 2020.

* cited by examiner

METHOD AND ASSEMBLY FOR ALIGNING WIND TURBINE STRUCTURAL PARTS

FIELD OF THE INVENTION

The present invention relates to an assembly of two structural parts of a wind turbine wherein the structural parts are to be connected in a flange-to-flange connection by a number of bolts and such that a flange of the first structural part and a flange of the second are centrally and rotationally aligned whereby a first borehole in the flange of the first structural part is matched and aligned with a corresponding first borehole in the flange of the second structural part. The invention further relates to a method of positioning and connecting two structural parts of a wind turbine as described above.

BACKGROUND OF THE INVENTION

The present invention concerns devices and methods for ensuring a desired central and rotational alignment of structural parts of a wind turbine during their assembly and connection. The structural parts are traditionally connected in a flange-to-flange connection by a number of bolts. For a proper connection, the flanges need to be centrally aligned so that the flanges are positioned face-to-face and further rotationally aligned so that the boreholes of the flanges match. The structural parts of a wind turbine such as a tower section, a foundation section, a blade, a yaw bearing or the like, are big and heavy components and their connection involve large cranes or other types of hoisting equipment and need to be performed on site often under non-ideal conditions such as at sea, in non-even terrain etc.

Traditionally the central and rotational alignment of structural parts, such as two wind turbine tower sections, or a tower section onto a foundation section, is performed by the matching of outside visual markers on both structural parts which however can only be performed with some uncertainty. The final adjustment is then obtained by man power by simply rocking the flanges into position by the use of a mandrel through a borehole.

To increase personnel safety the assembly of such structural parts should ideally be carried out without any personnel remaining inside the hollow tower or foundation section anywhere near where the structural parts are to be connected. Furthermore, in addition to being centrally and rotationally aligned to make the boreholes in the flanges match, the structural parts also need to be rotationally aligned in a specific way to make other components fit and connect such as ladders, wiring, cable trays, elevators etc. These may for the most part be positioned inside the structural parts and thereby at least partly invisible and not usable for guidance during the assembly of the structural parts.

OBJECT OF THE INVENTION

It is therefore an object of embodiments of the present invention to provide an improved assembly and method of rotationally aligning two structural parts of a wind turbine.

So, in a first aspect the present invention relates to an assembly of two structural parts of a wind turbine wherein the structural parts are to be connected in a flange-to-flange connection by a number of bolts and such that a flange of the first structural part and a flange of the second are centrally and rotationally aligned whereby a first borehole in the flange of the first structural part is matched and aligned with a corresponding first borehole in the flange of the second structural part. The assembly further comprising a first rotational guide member releasably attached to the flange of the first structural part and a second rotational guide member releasably attached to the flange of the second structural part. Each rotational guide member comprises a U-shaped structure of a first leg portion and a second leg portion connected by a central portion, the first leg portion ending in a positioning portion shaped to be inserted into a borehole, and the second leg portion comprising a stop member, wherein the stop member of the first rotational guide member is configured for abutment to the second leg portion of the second rotational guide member when the flanges of the first and second structural parts are centrally and rotationally aligned. For simplicity, it is preferred that the positioning portion is shaped to be inserted into one borehole, but in one embodiment, the positioning portion is shaped to be inserted into at least two, such as two, three or four (preferably adjacent) boreholes to enhance stiffness and hence precision of the rotational alignment.

In one embodiment, each rotational guide member comprises a U-shaped or L-shaped structure of a first leg portion and a second leg portion connected by a central portion and for at least one of the rotational guide members the structure comprised in the rotational guide member is U-shaped. The use of an L-shaped rotational guide member is particularly advantageous for a structural part that is standing on the flange to be assembled since the second leg portion of the rotational guide member will not reach below the flange irrespective of the length of the second leg portion.

The two structural parts of the wind turbine may for example comprise a tower section, a nacelle, a blade, a hub, and/or a foundation section. The structural parts each comprise a flange which flanges are to be connected not only such that the flanges are centrally aligned and the flanges abut or lie against each other, but additionally such that the flanges are rotationally aligned and one borehole in one of the flanges match a specific borehole in the other flange. For this purpose, the assembly further comprises at least two rotational guide members. Hereby is obtained a simple means for ensuring that the two structural wind turbine parts are positioned and connected to each other as desired and without the need for a person guiding the structural parts or pushing them into position. This further reduces the risk for injuries on any personnel. Further, as the rotational guide members can be attached to the flanges even long time prior to assembly such as for example already in connection to the manufacturing of the structural parts, the assembly comprising the rotational guide members reduces the amount of manual labour needed to be performed on the assembly site. This is especially advantageous for off-shore wind turbines, and for the assembly of structural parts taking place many meters above ground in unfavourable working conditions.

As the rotational guide members are releasably attached to the flanges is obtained, that the rotational guide members can be reused in other assemblies. Further is realized that the rotational guide members can be inserted into a borehole of the flange without permanently occupying the borehole. The insertion into a borehole provides for an easy way of positioning the rotational guide members correctly and as desired on the flanges.

Each rotational guide member comprises a generally U-shaped or L-shaped structure of a first leg portion and a second leg portion connected by a central portion. The first and/or second leg portions may extend at a right angle to the central portion. If only one of the first and second leg are at a right angle, the rotational guide member will comprise a generally L-shaped structure. If both the first and the second legs are at a right angle, the rotational guide member will comprise a generally U-shaped structure. The first leg portion ends in a positioning portion shaped to be inserted into a borehole. It is preferred that the insertion of the first leg portion into the borehole (as well as the length of the first leg portion) is less than the thickness of the flange as this prevents the first leg to be caught by a borehole of the other structural part during positioning of the structural parts. As mentioned previously, the rotational guide member can be easily positioned in a pre-determined way to the flange without any prior measuring or the like. The positioning portion may be cylindrical and of an outer diameter corresponding to the inner diameter of the borehole. Alternatively, the positioning portion may have a cross sectional area of a square, a star, or a polygon or some other shape with an outer periphery fitting within the borehole. In an embodiment, the positioning portion is cylindrical with a number of ring-shaped protrusions, wherein the outer diameter of the protrusions corresponds to the inner diameter of the borehole. Hereby the positioning portion only lies or presses against a reduced amount of the inner surface of the borehole thereby being shaped to still maintain its position when inserted into the borehole while at the same time being easier to withdraw from the borehole. Because of the shaped structure of the rotational guide members, these can be positioned on a flange without obstructing the outer surfaces of the flange which are to be adjoined. Hereby the rotational guide members may remain attached to the flanges during the entire assembly of the structural parts and need not be removed before the structural parts are in their final position. This again reduces the need for manual labour and makes the process of aligning the structural parts faster and less complicated.

The second leg portion of each rotational guide member comprises a stop member. The stop member may form an integral part or a detachable part of the second leg portion. The stop member of the first rotational guide member is configured for abutment to the second leg portion of the second rotational guide member when the flanges of the first and second structural parts are centrally and rotationally aligned. The abutment may be obtained by the two stop members being configured for abutting each other, and/or by a stop member being dimensioned to abut a part of the second leg portion not being the stop member of the other rotational guide member. Hereby the second leg portions of the two rotational guides abut or lie sideways up against each other in the situation when the flanges are centrally and rotationally aligned as desired. The centrally and rotationally alignment can thereby easily be obtained by the attachment of the rotational guide members and then rotating the one structural part relative to the other structural part until the two rotational guide members contact. The configuration of the stop member may be obtained by dimensioning the width of the stop member in the plane of the flange as a function of the distance between two neighbouring boreholes in the flanges to be aligned. In this way, when two rotational guide members are inserted in neighbouring boreholes, the stop member of one rotational guide member will abut the second leg portion of the other rotational guide member and optionally additionally vice versa.

In an embodiment of the invention, each of the rotational guide members comprises an attachment member configured for the releasably attachment of the rotational guide member to a surface of the flange of one of the structural parts. The attachment member may comprise a magnet, which provides for a simple and fast way to both attach the rotational guide member to the flange and to ensure that rotational guide member is attached up against a surface of the flange.

Generally, a flange can be described to a number of boreholes extending from an outer surface to an inner surface, and further comprises a side surface extending between the outer surface and the inner surface. According to an embodiment of the invention, the U-shaped structure of rotational guide members is dimensioned to be inserted in a borehole of one of the flanges and extend from the borehole along the inner surface and up against the side surface of the flange. Hereby the rotational guide member is dimensioned to fit onto the flange and to thereby stay in place and be positioned correctly to thereby obtain the desired centrally and rotationally alignment of the flanges. Further, the U-shaped structure reduces the risk of the rotational guide member being pushed or deformed out of or away from its position during positioning of the structural parts. Further, the U-shaped structure makes the rotational guide member relatively easy to manually attach to the flange.

In an embodiment, the second leg portion extends a length larger than a height of the side surface. Hereby is obtained that the second leg portion projects from the flange and will extend a certain length into the opening of the other flange when positioned. The second leg portion of the two rotational guide members need not be of equal length. The longer the second leg portions are, the more they can abut sideways to each other during assembly.

Further, as the rotational guide members projects from the flanges, they may be used for visual guidance during the initial positioning of the structural parts relative to each other.

In an embodiment, the stop member lies against the side surface of the flange. This aids in keeping the stop member and thereby the rotational guide member in its desired position during the assembly of the structural parts.

In an embodiment, the stop member of each rotational member extends a width transversely to the length of the second leg portion, the width corresponding to the distance between two neighbouring boreholes in the flange. Transversely to the length of the second leg portion is here to be understood as in a plane parallel to the surface plane of the flanges. In this way is obtained that when the stop member is positioned symmetrically around the second leg portion, then the stop member will extend a distance in the width direction such as to meet and abut the stop member of another identical rotational member, when the two rotational guide members are inserted in neighbouring boreholes.

According to an embodiment, each of the rotational members are symmetrical about a plane passing through the first leg portion, the second leg portion and the central portion. This is advantageous in that the rotational guide members can then be used equally well in either flange. Further, the rotational guide members can be brought into contact equally well from either side. Hereby the risk of making an error when positioning the rotational guide members is considerably reduced.

In an embodiment, the first rotational member is inserted in the first borehole in the flange of the first structural part and the second rotational member is inserted in a neighbouring borehole to the first borehole in the flange of the second structural part. Hereby the rotational guide members are positioned a well-defined distance apart and the second leg portions can be pre-configured to abut to each other when that distance is realized corresponding to the desired positioning and alignment of the flanges. Further, the boreholes of the flanges are traditionally numbered or in other ways marked, and so the process of inserting one rotational guide member in a specific first borehole in the first flange and another rotational guide member in a neighbouring borehole to the first borehole in the other flange is relatively simple and fast even if the flanges are placed miles apart at to different locations when inserting the rotational guide members.

In an embodiment, at least the second leg portion of the U-shaped or L-shaped structure is made of a flexible material such as for example POM or Polyacetal. Hereby, the rotational guide member attains some flexibility especially in a sideways direction reducing the risk of the rotational guide member breaking or deforming permanently during the positioning of the structural parts.

According to a further embodiment, the stop member and/or the positioning portion of a rotational guide member is exchangeable. Hereby, the rotational guide member can easily be modified to fit to flanges of other dimensions and can thereby be reused for the alignment of structural parts with different types or sizes of flanges.

In an embodiment, the assembly further comprises a number of alignment devices attached to the flange of the first or the second structural part and configured for centrally alignment of the structural parts. The alignment devices may in this way aid in positioning the flanges of the structural parts in a face-to-face relationship and bringing the structural parts close to each other. Hereafter the rotational guide members aid in obtaining the rotational alignment of the structural parts while maintaining or fine tuning the central alignment. In one embodiment, at least one of the alignment devices is a rotational guide member so that the alignment device is configured to both centrally alignment of the structural parts (in collaboration with further alignment devices) and for rotational alignment of the structural parts (in collaboration with more rotational guide members).

In a further aspect the present invention relates to a method of positioning and connecting two structural parts of a wind turbine wherein the structural parts are to be connected in a flange-to-flange connection by a number of bolts and such that a flange of the first structural part and a flange of the second are centrally and rotationally aligned whereby a first borehole in the flange of the first structural part is matched and aligned with/connected to a corresponding first borehole in the flange of the second structural part, the method comprising:
  positioning a first rotation guide member in the first borehole in the flange of the first structural part;
  positioning a second rotation guide member in a second borehole in the flange of the second structural part, wherein the second borehole is a neighbouring borehole to the first borehole in the flange of the second structural part;
  centrally aligning the structural parts with the flanges face-to-face;
  moving the structural parts towards each other;
  rotating the first structural part relative to the second while maintaining the flanges face-to-face and until the first rotational guide member comes into contact with the second rotational guide member; and
  positioning the first structural part on the second structural part.

In an embodiment, the method further comprises removing the first and second rotational guide members and connecting the flanges of the first and second structural parts by bolts. It is preferred that the first and second rotational guide members are removed after connecting the flanges of the first and second structural parts by bolts as this ensures visually that the first and second structural parts remains aligned until the first and second structural parts are connected. However, removing of one or more of the rotational guide members may be done before connecting the flanges by bolts as the rotational guides typically does not provide any fixating force between the flanges after the flanges have been positioned onto each other.

The step of centrally aligning the structural parts may in an embodiment comprise positioning a number of alignment devices in the second structural part such as to project from the flange and lowering the first structural part over the alignment devices.

The advantages of these methods are as mentioned previously in relation to the first aspect of the invention of an assembly of two structural parts and rotational guide members.

In a further embodiment of the assembly of the invention further comprises at least one sensor arranged at or near at least one of the structural parts, preferably at or near one of the rotational guide members. This allows for distance monitoring of the alignment process and hence allows for a safer way of operating the assembly. The sensor may for example be one or more of a positioning sensor determining the position and/or orientation of one or more of the structural parts or guide members; a distance meter measuring a distance to a stop member or between two stop members; and/or a camera providing live images or data for image recognition.

In a further embodiment of the method according to the invention, the method further comprises the steps of arranging at least one sensor at or near at least one of the structural parts, and monitoring the positioning and connecting process. This method may further comprise the steps of controlling the process of the alignment or the finally aligned positioning of the structural parts before the flanges of the structural parts are connected by bolts. This method may also comprise the step of performing the method automatic based on at least partially on the input received from the at least one sensor.

BRIEF DESCRIPTION OF THE DRAWINGS

In the following different embodiments of the invention will be described with reference to the drawings, wherein.

DETAILED DESCRIPTION OF THE DRAWINGS

Figure 1:
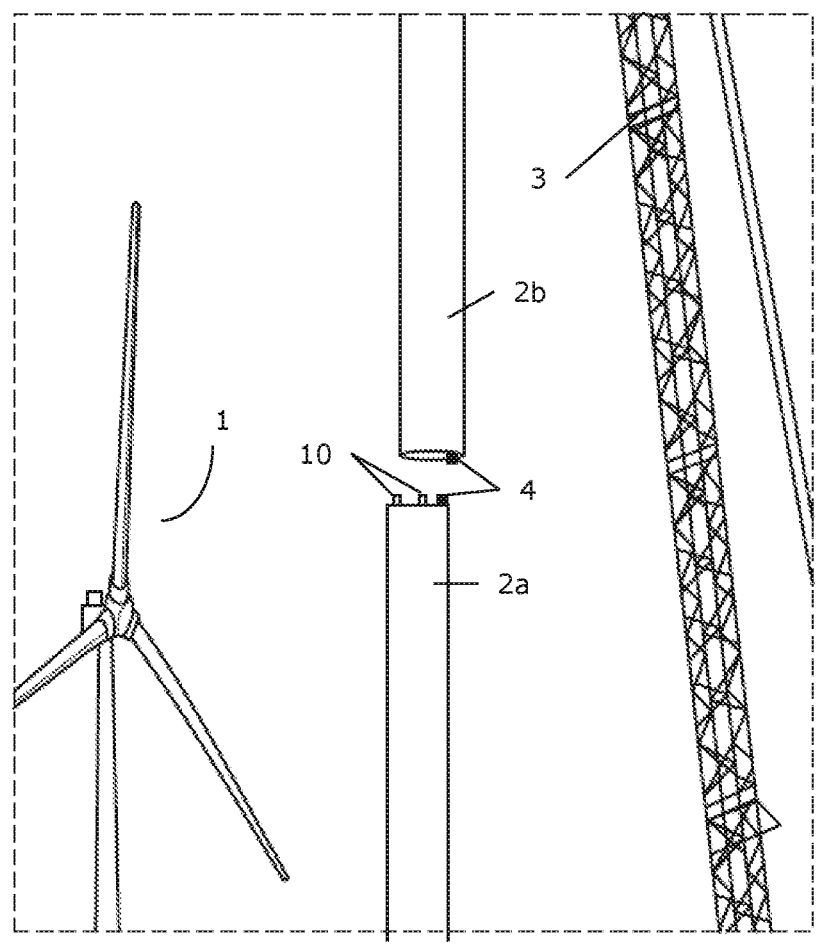
FIG. 1 is a sketch of two tower sections of a wind turbine being assembled.

FIG. 1 illustrates two tower sections 2a, 2b of a wind turbine 1 being assembled. Here, a first structural part 2a in the form of a tower section is positioned and in place and a second structural part 2b, such as another tower section or the nacelle (not shown) of a wind turbine, is suspended from a crane 3 and is to be connected with the first structural part 2a in a flange-to-flange connection. For this purpose, a plurality of alignment devices schematically illustrated by numeral 10 may be mounted on the structural parts. For ensuring a correct rotational alignment of the two structural parts 2a, 2b a rotational guide member 4 is attached to each of the flanges of the two structural parts.

Figure 2:
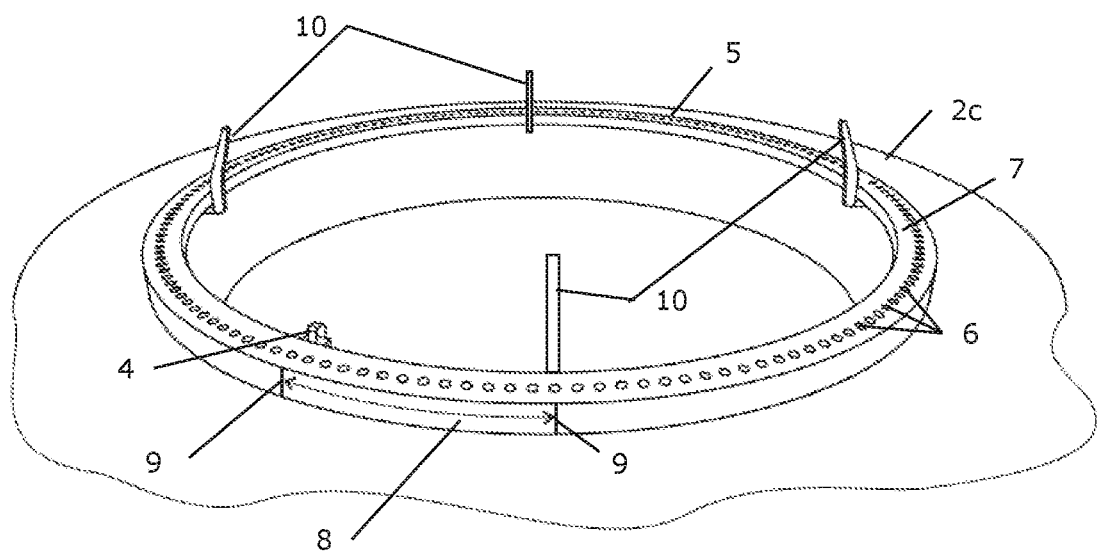
FIG. 2 is a sketch of a foundation section for a wind turbine comprising a number of alignment devices and a rotational guide member according to an embodiment of the invention.

FIG. 2 is a sketch of a structural part forming a foundation section 2c for a wind turbine and prepared for the attachment to another structural part (not shown). The foundation section may equally well form part of an off-shore or of an on-shore wind turbine. The foundation section 2c comprises a flange 5 with a number of boreholes 6 which is to be connected to a corresponding flange of another structural part. The figure shows a rotational guide member 4 attached to the flange 5. The rotational guide member is inserted into one of the boreholes 6 from the underside or the inner side of the flange 5 as illustrated in the later FIGS. 7 and 8. In this way the rotational guide member is positioned such as not to obstruct the outer surface 7 of the flange 5 which is to abut the flange of the other structural part when connected. The rotational guide member is inserted into a specific borehole which corresponds to where the second rotational guide member attached to the second structural part is mounted. In this way, the two rotational guide members can be used to ensure a correct positioning and rotational alignment of the two structural parts. Further, a number of alignment devices 10 are attached to the flange 5. The rotational guide member 4 is preferably positioned with some radial distance (as marked by the arrow 8) to the nearest alignment device. This will ease the positioning of the two structural parts as will be described in more details in relation to FIG. 9. The structural part 2c may further comprise a marking 9 on the exterior of the structural part showing where the rotational guide member 4 and the nearest alignment device 10 are. As these remain visible during positioning of the two structural parts, the marking 9 can aid during a part of the positioning and alignment procedure.

Figure 3:
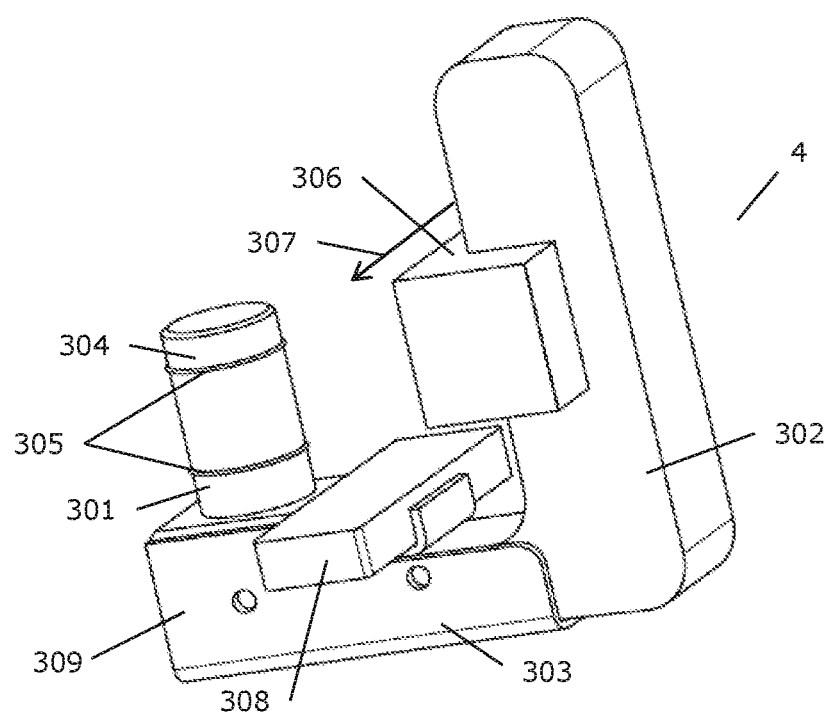
FIGS. 3-5 show an embodiment of a rotational guide member in a perspective, a cross sectional, and an exploded view, respectively.
Figure 4:
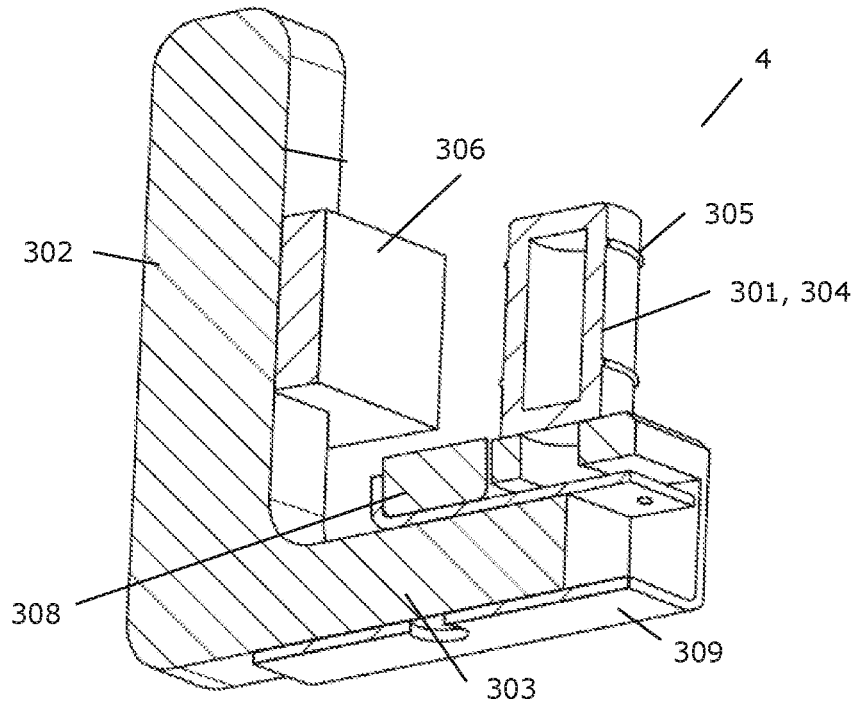
Figure 5:
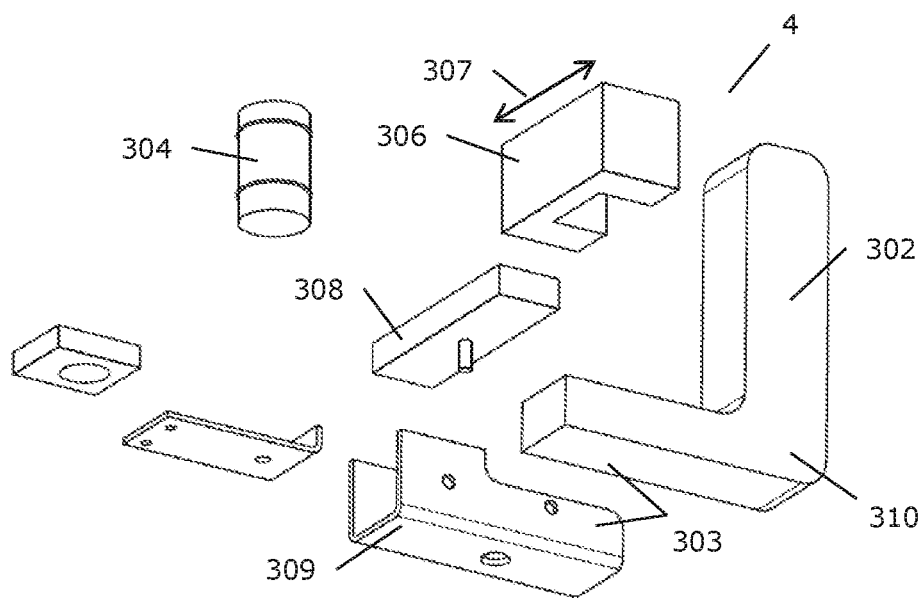

An embodiment of a rotational guide member is shown in more detail in the FIGS. 3, 4, and 5. FIG. 3 show a rotational guide member 4 in a perspective view. The rotational guide member 4 of FIGS. 3, 4 and 5 comprises a generally U-shaped structure of a first leg portion 301 and a second leg portion 302 connected by a central portion 303. The first leg portion 301 comprises a positioning portion 304 which is shaped to be inserted into a borehole of one of the flanges of the structural parts of the wind turbine. Here the positioning portion is of a generally cylindrical shape with two ring shaped protrusions 305. The diameter of the protrusions 305 corresponds to the diameter of the borehole. Because of the protrusions 305, the positioning portion 304 can be more easily retracted from the borehole when desired. The positioning portion 304 ensures that the rotational guide member 4 is placed correctly on the flange with a view to obtain the desired positioning and centrally and rotationally alignment of the two flanges whereby a first borehole in the first flange is matched and aligned with a corresponding first borehole in the other flange. The positioning portion 304 can be exchanged for example to another portion of another diameter. In this way, the rotational guide member 4 can be easily adapted to fit to other flanges with different borehole sizes.

In this embodiment of a rotational guide member with a U-shaped structure, part of the second leg portion 302 and central portion 303 is formed by an L-shaped bar 310 which is received in and attached to a holder 309. Hereby the dimension of the central portion 303 can be easily adjusted, so that the same rotational guide member 4 can be used on different types and sized of flanges. For a rotational guide member with an L-shaped structure, the bar 310 would typically be a straight bar. The second leg portion 302 comprises a stop member 306. The second leg portions of a set of two rotational guide members 4a, 4b are configured such as to abut sideways to each other when the flanges they are placed on are centrally and rotationally aligned. This is shown in more detail in FIGS. 9E, F, and G. As an example, the two stop members of two rotational guide members 4a, 4b may be configured for abutting each other, and/or a stop member of two rotational guide members 4a, 4b may be dimensioned to abut the second leg portion of the other rotational guide member (as is the case with the embodiments shown in FIGS. 9E-G). The abutment is the most easily obtained by dimensioning the width 307 of the stop member so that it corresponds to the distance between two neighbouring boreholes in the flanges to be aligned. The stop member 306 is exchangeable and so the rotational guide member can easily be adapted to fit a different type of flange where the distance between the boreholes is different. The positioning portion 304 and the holder 309 for receiving the bar 310 is made of steel or a similar material yielding high stiffness properties. The L-shaped bar 310 and the stop member 306 are preferably made of a flexible material such as a plastic such as for example POM to give the rotational guide member some flexibility to thereby withstand any sideways pushing on the stop member during assembly and alignment of the flanges.

The rotational guide member 4 further comprises an attachment member 308 configured for the releasably attachment of the rotational guide member to a surface of the flange of one of the structural parts. In this embodiment, the attachment member 308 is a magnet which is attached to or form part of the central portion 303 of the rotational guide member. The attachment member could alternatively or additionally be positioned to form part of the second leg portion 302. The magnet is strong enough to support the weight of the rotational guide member.

The rotational guide member 4 is shown in a cross-sectional view in FIG. 4 and in an exploded view in FIG. 5. The different parts of the rotational guide member are attached by bolts, screws, rivets or the like fastening members (not shown).

Figure 7:
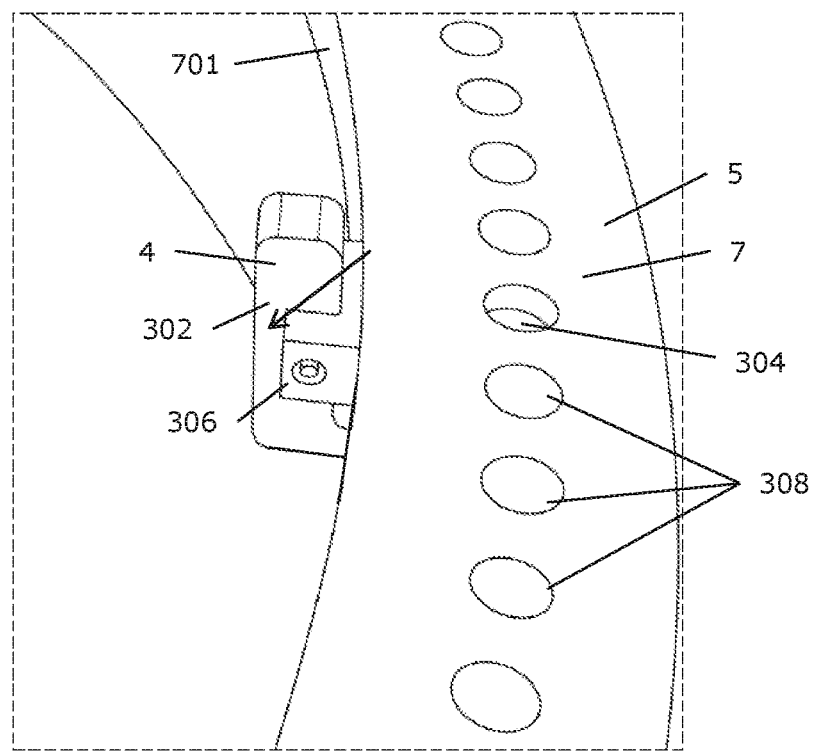
FIGS. 7-8 show a rotational guide member attached to a first and a second structural part, respectively.
Figure 8:
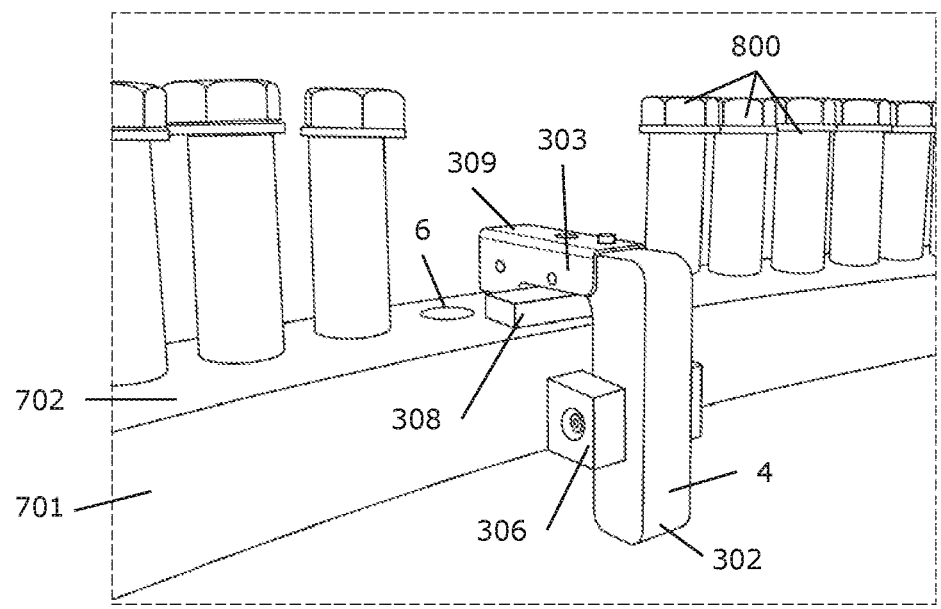

FIGS. 7 and 8 show a rotational guide member 4 attached to the flange 5 of a first and a second structural part, respectively. The flange 5 of each structural part comprises a number of boreholes 6 extending from an outer surface 7 to an inner surface 702 (see FIG. 8), and further comprises a side surface 701 extending between the outer surface 7 and the inner surface 702. The U-shaped structure of a rotational member 4 is dimensioned to be inserted in a borehole 6 of one of the flanges 5 and extend from the borehole 6 along the inner surface 702 and up against the side surface 701 of the flange. In this way, the outer surface 7 of the flange which is to lie against the other flange is left free and unobstructed by the rotational guide member. When attached to a flange 5, the positioning portion 304 of the rotational guide member is inserted into a borehole 6 (barely visible in FIG. 7) and the second leg portion 302 lies at least partly against the side surface 701 of the flange. In this embodiment, the stop member 306 lies against the side surface 701. Hereby, the rotational guide member maintains its position relative to the flange even if pushed sideways during assembly and positioning of the two structural parts. FIG. 8 further shows a number of bolts 800 loosely inserted in the boreholes 6 ready for connection.

Figure 6:
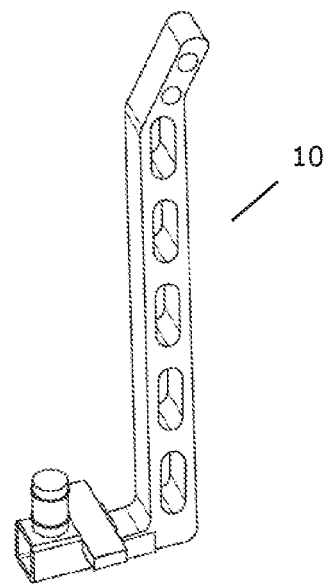
FIG. 6 shows an embodiment of an alignment device.
Figure 9A:
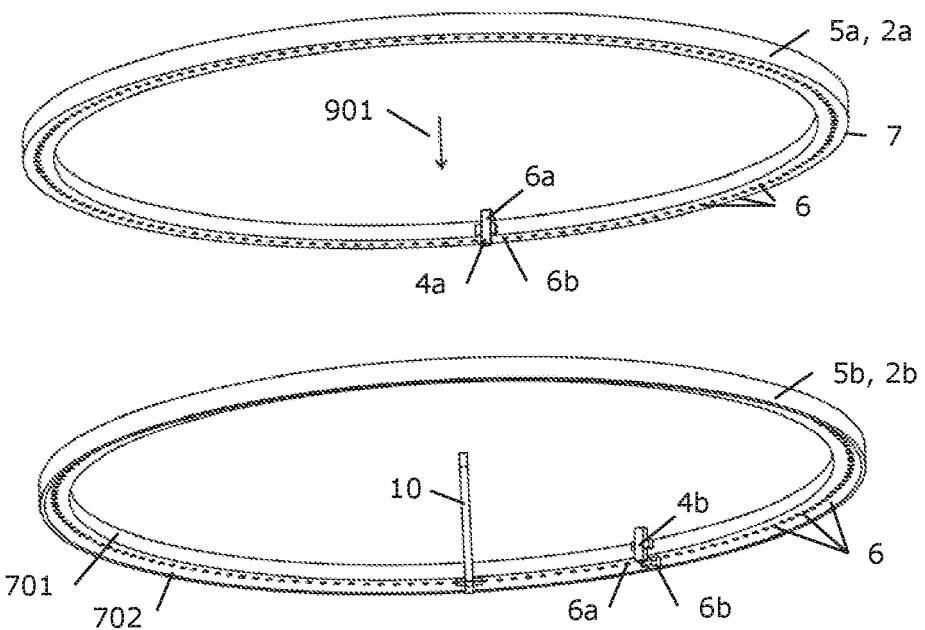
FIGS. 9A-G illustrate the method of positioning two structural parts for connection according to an embodiment of the invention
Figure 9B:
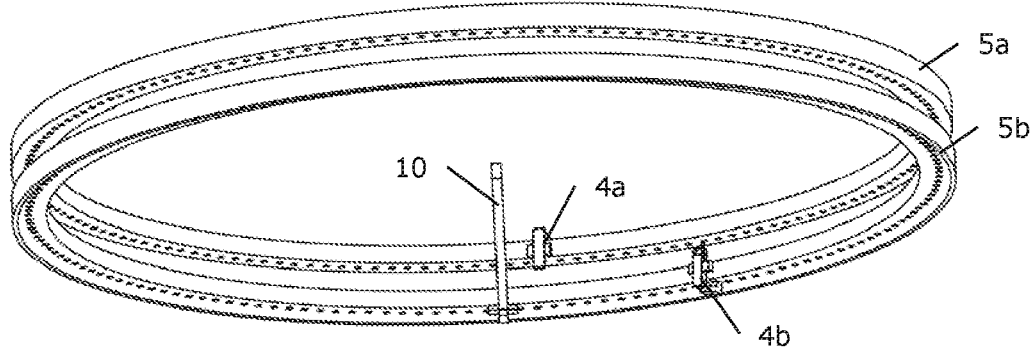
Figure 9C:
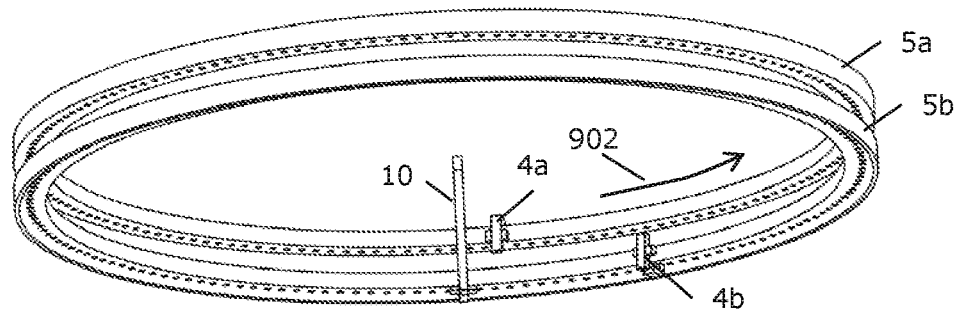

FIG. 6 shows an embodiment of an alignment device 10. The alignment device is likewise configured for being inserted into a borehole and for releasable attachment to a flange by means of a magnet. When inserted into a borehole, the alignment device extends a considerable length from the flange towards the other structural part for the other structural part to be lowered down over and guided into a central alignment of the two flanges. This is also illustrated in FIGS. 9A and 9B.

FIGS. 9A-G illustrate the method of positioning two structural parts 2a and 2b for connection according to an embodiment of the invention. The figures show the flanges 5a, 5b of each structural part (not shown to enhance clarity), which are to be centrally and rotationally aligned such that a first borehole 6a of the one flange match and is aligned to a specific first borehole 6a of the other flange.

A first rotation guide member 4a positioning in the first borehole 6a in the flange 5a of the first structural part 2a. Further, a second rotation guide member 4b is positioning in a second borehole 6b in the flange 5b of the second structural part 2b, wherein the second borehole 6b is a neighbouring borehole to the first borehole 6a in the flange 5b of the second structural part 2b. The rotational guide members 4 are positioned such that the second leg portions project from each of the structural parts. When one of the rotational guide member has an L-shaped structure, only the second leg of the rotational guide member with the U-shaped structure will project from the structural part.

Also, the method may optionally include the use of a number of alignment devices 10 attached to one or both of the flanges 5. For the sake of simplicity only one alignment device 10 is shown here, however, often a number of alignment devices like for example three to ten, preferably four to eight, such as four or six are used to ease the centrally alignment of the two flanges of the structural parts.

Figure 9D:
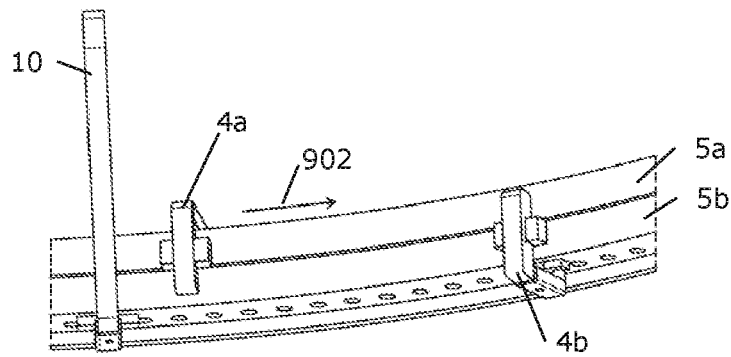
Figure 9E:
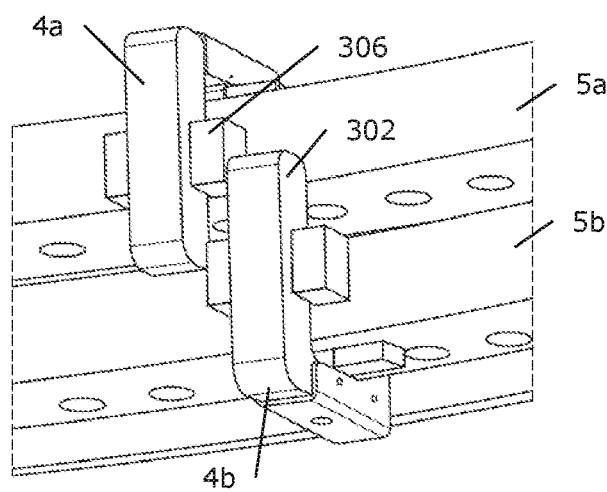

The two structural parts 2a, 2b are then centrally aligned with the flanges 5a, 5b face-to-face and the structural parts moved towards each other as illustrated by the arrow 901 in FIG. 9A. When the flanges are moved within a certain distance to each other as illustrated in FIG. 9B, the first structural part 1a is then rotated relative to the second 2b while maintaining the flanges face-to-face. This is illustrated by the arrow 902 in FIG. 9C of which an enlarged detail is shown in FIG. 9D. The distance between the structural parts depends on how much the second leg portions of each of the rotational guide members project from the flanges. The structural parts are then rotated relative to each other until the first rotational guide member 4a comes into contact with the second rotational guide member 4b as shown in the enlarged view in FIG. 9E. Here the stop member 306 of the first rotational guide member 4a abuts the second leg portion 302 of the second rotational guide member 4b and vice versa.

Figure 9F:
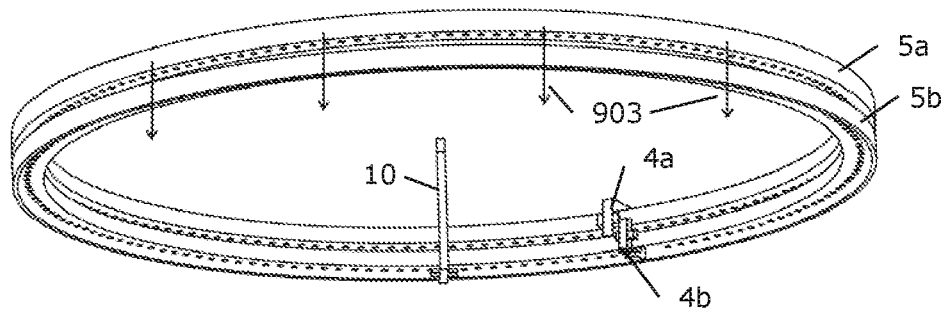
Figure 9G:
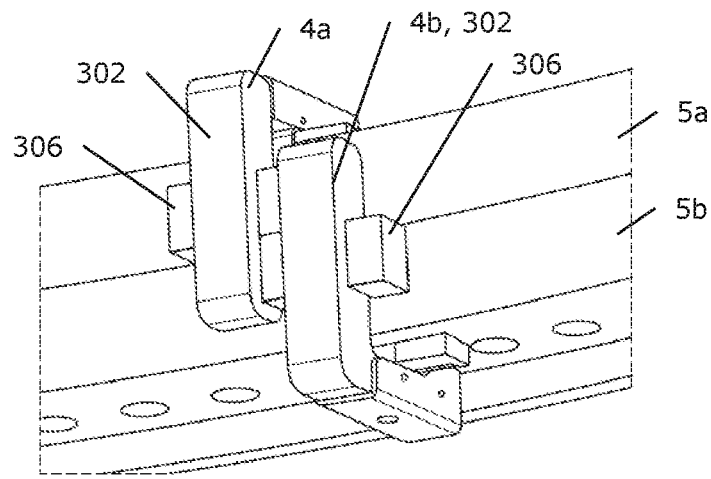

In this situation the flanges 5a, 5b are both centrally and rotationally aligned and the first structural part 2a is then lowered onto and positioned onto the second structural part 2b with the rotational guide members remaining in contact as illustrated by the arrows 903 in FIG. 9F and in a larger view in FIG. 9G where the flanges 5a, 5b abut each other. The rotational guide members can then be removed and the flanges connected by the bolts. It is preferred that the guide members are removed after connecting the flanges by bolts as this ensures visually that the first and second structural parts remains aligned until structural parts are connected. However, removing of one or more of the rotational guide members may be done before connecting the flanges by bolts as the rotational guides typically does not provide any substantial fixating force between the flanges after the flanges have been positioned onto each other.

Figure 10:
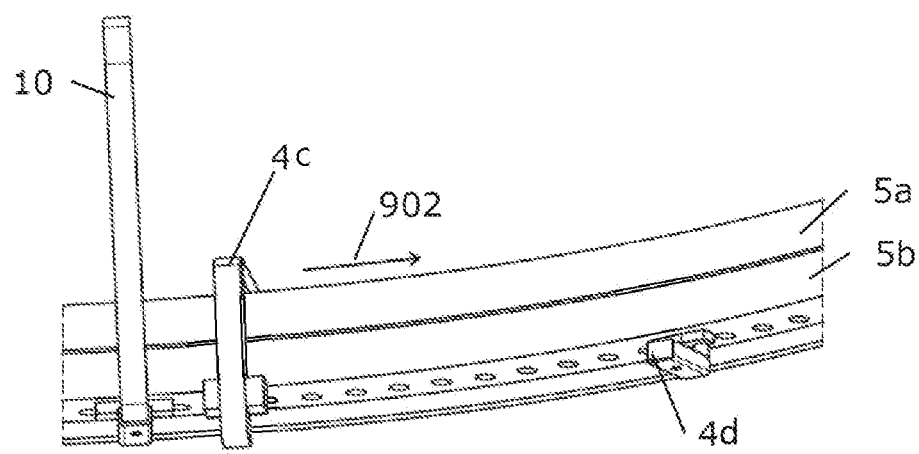
FIG. 10 illustrates an embodiment of the method of positioning two structural parts using an L-shaped rotational guide member.

FIG. 10 shows an embodiment where a rotational guide member 4d with an L-shaped structure is used in the setup of FIG. 9D. The corresponding rotational guide member 4c with a U-shaped structure has here an extended second leg portion.

Figure 11:
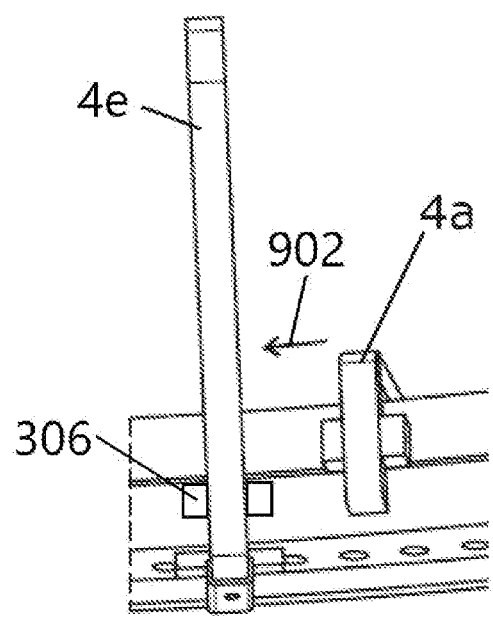
FIG. 11 illustrates an embodiment of the method of positioning two structural parts using an alignment devices that also is a rotational guide member.

In FIG. 11, an embodiment where one of the alignment devices also being used as a rotational guide member 4e is used in the setup of FIG. 9D. It is observed that the stop member 306 is arranged so that it will interact with the stop member or the second leg portion of the rotational guide member 4a. In FIG. 11, the rotational guide member 4a has a U-shaped structure, however, the rotational guide member 4a of FIG. 11 may also have a L-shaped structure (not shown) without changing the function of the setup.

The invention claimed is:

1. An assembly of first and second structural parts of a wind turbine wherein the first and second structural parts are to be connected in a flange-to-flange connection by a plurality of bolts and configured such that a flange of the first structural part and a flange of the second structural part are centrally and rotationally aligned whereby a plurality of boreholes in the flange of the first structural part is matched and aligned with a corresponding plurality of boreholes in the flange of the second structural part, the assembly further comprising:
   a first rotational guide member releasably attached to the flange of the first structural part; and
   a second rotational guide member releasably attached to the flange of the second structural part,
   wherein each of the first and second rotational guide members comprises a structure having a first leg portion and a second leg portion, the first leg portion ending in a positioning portion shaped to be inserted into one of the plurality of boreholes in the flange of the respective first or second structural part, and the second leg portion comprising a stop member,
   wherein the stop member of the first rotational guide member is configured for abutment to the second leg portion of the second rotational guide member when the flanges of the first and second structural parts are centrally and rotationally aligned, and
   wherein the structure of at least one of the first and second rotational guide members is U-shaped and includes a central portion connecting the first and second leg portions.

2. The assembly according to claim 1, wherein each structure of the first and second rotational guide members is U-shaped.

3. The assembly according to claim 1, wherein the first and second structural parts comprise a tower section and a foundation section or the first and second structural parts comprise two tower sections.

4. The assembly according to claim 1 wherein each of the first and second rotational guide members comprises an attachment member configured for releasable attachment to a surface of the flange of the respective first or second structural part.

5. The assembly according to claim 4, wherein the attachment member comprises a magnet.

6. The assembly according to claim 1, wherein the flange of each of the first and second structural parts comprises:
an outer surface;
an inner surface; and
a side surface extending between the outer surface and the inner surface,
wherein the plurality of boreholes in the flange extends from the outer surface to the inner surface, and
wherein the at least one of the first and second rotational guide members having the U-shaped structure is dimensioned so that when attached to the flange of the respective first or second structural part, the structure extends along the inner surface and up against the side surface of the flange.

7. The assembly according to claim 6, wherein the second leg portion of the at least one of the first and second rotational guide members having the U-shaped structure extends for a length greater than a height of the side surface of the flange of the respective first or second structural part.

8. The assembly according to claim 6, wherein the stop member of each of the first and second rotational guide members is configured to lie against the side surface of the flange of the respective first or second structural part.

9. The assembly according to claim 1, wherein the stop member of each of the first and second rotational guide members extends a width that is transverse to a length of the second leg portion, and wherein the width of the stop member corresponds to a distance between two neighbouring boreholes of the plurality of boreholes in the flange of the respective first or second structural part.

10. The assembly according to claim 1, wherein the at least one of the first and second rotational guide members having the U-shaped structure is symmetric about a plane passing through the first leg portion, the second leg portion and the central portion.

11. The assembly according to claim 1, wherein the first rotational guide member is inserted in a first borehole of the plurality of boreholes in the flange of the first structural part, wherein the flange of the second structural part has a first borehole of the plurality of boreholes matched and aligned with the first borehole of the first structural part, and wherein the second rotational member is inserted in a neighbouring borehole to the first borehole in the flange of the second structural part.

12. The assembly according to claim 1, wherein at least the second leg portion of the at least one of the first and second rotational guide members having the U-shaped structure is made of a flexible material.

13. The assembly according to claim 1, wherein each of the first and second rotational guide members is attached to the flange of the respective first or second structural part prior to assembly and connection of the flanges and such that the second leg portion of the at least one of the first and second rotational guide members having the U-shaped structure projects from its respective structural part.

14. The assembly according to claim 1, wherein the stop member of at least one of the first and second rotational guide members is exchangeable.

15. The assembly according to claim 1, wherein the positioning portion of at least one of the first and second rotational guide members is exchangeable.

16. The assembly according to claim 1, wherein the assembly further comprises a plurality of alignment devices attached to the flange of the first or the second structural part and configured for central alignment of the first and second structural parts.

17. The assembly according to claim 16, wherein the first or second rotational guide member includes one of the plurality of alignment devices.

18. The assembly according to claim 1, wherein the assembly further comprises at least one sensor arranged at or near at least one of the first and second structural parts.

19. A method of positioning and connecting first and second structural parts of a wind turbine wherein the first and second structural parts are to be connected in a flange-to-flange connection by a plurality of bolts and such that a flange of the first structural part and a flange of the second are centrally and rotationally aligned whereby a plurality of boreholes in the flange of the first structural part is matched and aligned with a corresponding plurality of boreholes in the flange of the second structural part, the method comprising:
positioning a first rotation guide member in a first borehole of the plurality of boreholes in the flange of the first structural part;
positioning a second rotation guide member in a second borehole of the plurality of boreholes in the flange of the second structural part, wherein the second borehole is a neighbouring borehole to a first borehole in the flange of the second structural part that is matched and aligned with the first borehole in the flange of the first structural part;
centrally aligning the first and second structural parts with the flanges face-to-face;
moving the first and second structural parts towards each other;
rotating the first structural part relative to the second structural part while maintaining the flanges face-to-face and until the first rotational guide member comes into contact with the second rotational guide member; and
positioning the first structural part on the second structural part.

20. The method according to claim 19 further comprising removing the first and second rotational guide members and connecting the flanges of the first and second structural parts by bolts.

21. The method according to claim 19, wherein the step of centrally aligning the first and second structural parts comprises:
positioning a plurality of alignment devices in the second structural part so as to project from the flange of the second structural part; and
lowering the first structural part over the plurality of alignment devices.

* * * * *